(12) United States Patent
Bullock et al.

(10) Patent No.: US 9,470,232 B2
(45) Date of Patent: Oct. 18, 2016

(54) ADJUSTABLE CENTRIFUGAL GOVERNOR SPEED CONTROL

(75) Inventors: Geoffrey Alexander Bullock, Jordan, MN (US); John Russell Ingebrand, New Prague, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 469 days.

(21) Appl. No.: 14/110,361

(22) PCT Filed: Apr. 3, 2012

(86) PCT No.: PCT/US2012/031987
§ 371 (c)(1),
(2), (4) Date: Oct. 7, 2013

(87) PCT Pub. No.: WO2012/138650
PCT Pub. Date: Oct. 11, 2012

(65) Prior Publication Data
US 2014/0030081 A1    Jan. 30, 2014

Related U.S. Application Data

(60) Provisional application No. 61/472,692, filed on Apr. 7, 2011.

(51) Int. Cl.
| | |
|---|---|
| *G05D 13/10* | (2006.01) |
| *F04D 17/00* | (2006.01) |
| *F01C 20/24* | (2006.01) |
| *B01F 15/00* | (2006.01) |
| *F01C 1/344* | (2006.01) |

(52) U.S. Cl.
CPC ............... *F04D 17/00* (2013.01); *F01C 20/24* (2013.01); *G05D 13/10* (2013.01); *B01F 15/00525* (2013.01); *F01C 1/344* (2013.01)

(58) Field of Classification Search
CPC ....... G05D 13/10; G05D 13/12; G05D 13/14
See application file for complete search history.

(56) References Cited

U.S. PATENT DOCUMENTS

| | | |
|---|---|---|
| 3,384,343 A | 5/1968 | Bangerter |
| 3,749,530 A | 7/1973 | Amador |
| 4,123,942 A | 11/1978 | Rumyantsev |
| 4,222,702 A | 9/1980 | Rush |
| 6,393,837 B1 | 5/2002 | Tomioka |
| 6,409,584 B1 | 6/2002 | Lin |

FOREIGN PATENT DOCUMENTS

| | | |
|---|---|---|
| GB | 2066903 A | 7/1981 |
| JP | 2001034343 A | 2/2001 |

OTHER PUBLICATIONS

European Patent Office, Extended European Search Report, Feb. 20, 2015, 6 pages.
International Search Report and Written Opinion, mailed Dec. 14, 2012.

*Primary Examiner* — John K Fristoe, Jr.
*Assistant Examiner* — Brian O Peters
(74) *Attorney, Agent, or Firm* — Kinney & Lange, P.A.

(57) ABSTRACT

A rotational speed governor for an air motor comprises a housing, a valve, a shaft, a cross-bar, a plate and a pair of weights. The housing has an air inlet and an air outlet. The valve is disposed between the air inlet and the air outlet. The shaft extends along an axis within the housing. The cross-bar is connected to the shaft. The plate intersects the shaft between the valve and the crossbar. The weights are rotatably connected to the crossbar at pivot points. Each weight comprises an arcuately profiled edge extending beyond the crossbar to engage the plate. The arcuately profiled edges are shaped to increase a moment arm on the plate as the weights pivot away from the shaft.

15 Claims, 6 Drawing Sheets

ADJUSTABLE CENTRIFUGAL GOVERNOR SPEED CONTROL

BACKGROUND

The present invention relates generally to speed controls for pneumatic devices. More particularly, the present invention relates to centrifugal governors for rotary air motors such as rotary vane air motors.

Many pneumatic tools use a rotary vane air motor as an input. Rotary vane air motors utilize a flow of compressed air to turn a shaft. In rotary vane air motors, a hub includes a plurality of vanes across which a pressure differential is produced to turn the shaft. Typically, such motors are powered by a supply of compressed that is provided at a constant pressure. As such, the speed of the motor changes only depending on the load placed on the shaft. For example, in paint agitators, the speed of an air motor used to rotate the agitator increases as the volume of paint in its container diminishes. The lack of an air motor speed control is acceptable in certain situation where precise speed control is not needed or where the operator can skillfully control performance of the pneumatic tool. It is, however, desirable to limit the speed at which the air motor can operate to prevent adverse operating conditions of the pneumatic tool. For example, it is desirable to limit the speed of paint agitators to prevent unnecessary introduction of air into the paint. Thus, many rotary vane air motors are provided with governors that simply limit the top speed of the output shaft.

Centrifugal governors are conventionally used with pneumatic tools powered by rotary vane air motors. Centrifugal governors typically comprise a pair of weights that are coupled to the air motor shaft. As the shaft rotates, the weights are forced radially outward away from the shaft under centrifugal force. A stop mechanism is positioned adjacent the weights such that air supplied to the motor is cut off when the shaft rotates fast enough to propel the weights into the stop mechanism. These types of centrifugal governors thus only provide a simple on/off mechanism. So long as the shaft rotates below a threshold speed, the air motor will rotate at whatever speed is dictated by the shaft load. At a threshold speed, the air motor is temporarily deprived of all air flow until the shaft speed slows down.

Pneumatic tools and rotary vane air motors can be provided with external speed controls that permit variation in the air motor shaft speed. For example, a restriction, such as a needle valve, can be provided at the exhaust of the air motor to limit the amount of air that can leave the motor at high speeds, thereby limiting the pressure drop across the motor to prevent speed increases. Similarly, the inlet to the motor can be throttled to achieve the same result. These throttles, however, do not control shaft speed very well as loading on the shaft changes. It is desirable to be able to more accurately control the speed of air motors independent of the load placed on the shaft without stopping rotational power to the shaft, such as for use in paint agitator applications. There is, therefore, a need for improved speed control and governor systems in pneumatic tools and air motors.

SUMMARY

The present invention is directed to a rotational speed governor for an air motor. The rotational speed governor comprises a housing, a valve, a shaft, a cross-bar, a plate and a pair of weights. The housing has an air inlet and an air outlet. The valve is disposed between the air inlet and the air outlet. The shaft extends along an axis within the housing. The cross-bar is connected to the shaft. The plate intersects the shaft between the valve and the crossbar. The weights are rotatably connected to the cross-bar at pivot points. Each weight comprises an arcuately profiled edge extending beyond the crossbar to engage the plate. The arcuately profiled edges are shaped to increase a moment arm on the plate as the weights pivot away from the shaft.

DETAILED DESCRIPTION

Figure 1:
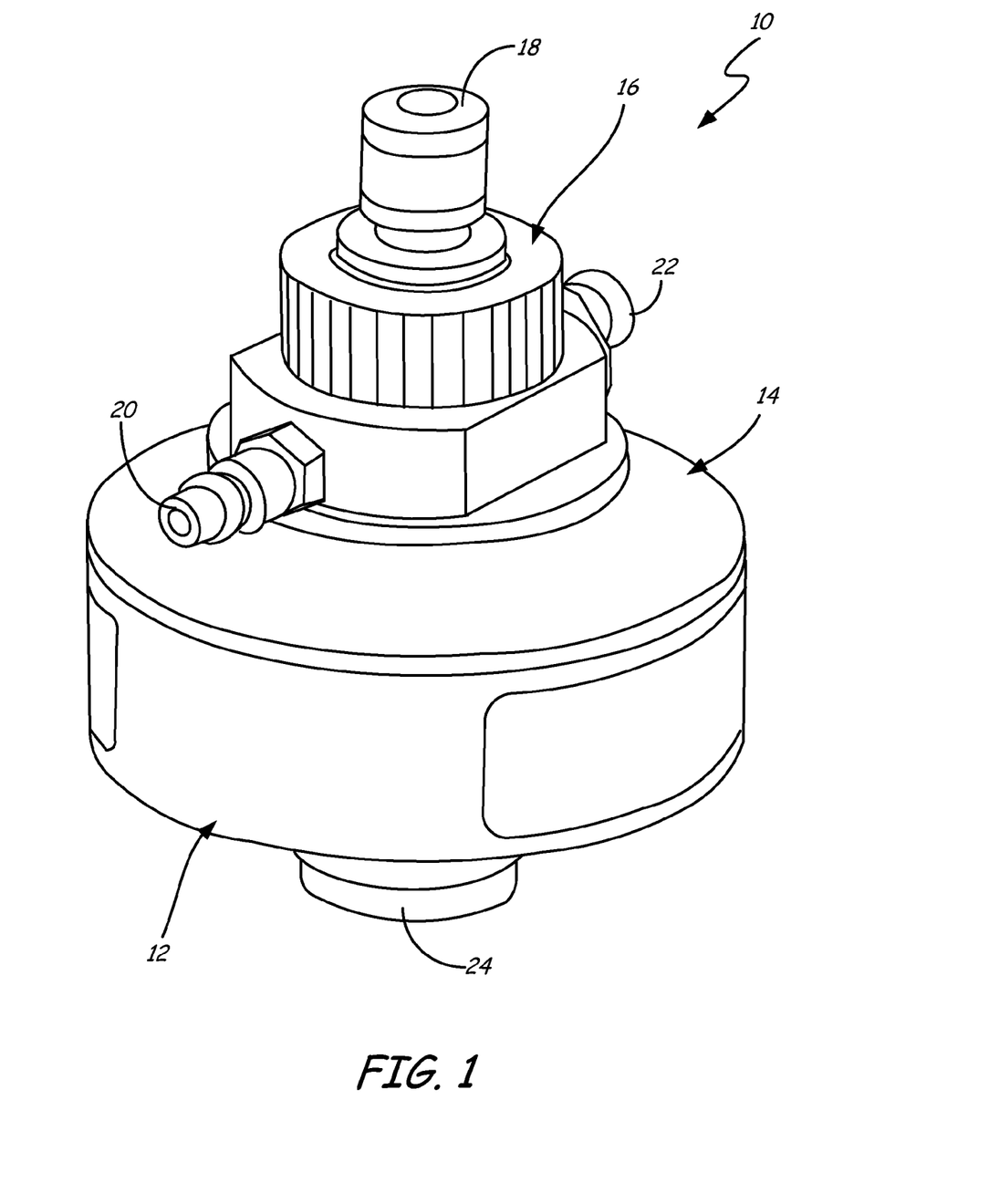
FIG. 1 is a perspective view of a centrifugal governor of the present invention having an adjustable speed control for use with a pneumatic motor.

FIG. 1 is a perspective view of centrifugal governor 10 having an adjustable speed control for use with a pneumatic motor. Centrifugal governor 10 includes lower housing 12, upper housing 14, cap 16, knob 18, inlet 20, outlet 22 and coupler 24. Governor 10 is used to limit the supply of compressed air provided to an air motor used to drive a pneumatic power tool. Governor 10 is joined to a shaft of the air motor at coupler 24. Typically, coupler 24 joins to an exposed end of the shaft, opposite the drive end. Compressed air is routed into inlet 20, through governor 10, and out to outlet 22 before being used to drive the air motor to which it is coupled. Lower housing 12 and upper housing 14 come together to enclose the centrifugal governor mechanism of the present invention. Specifically, a governor shaft extends from coupler 24 to a valve mechanism. The valve mechanism extends through to knob 18. The valve mechanism is positioned in an airflow path between inlet 20 and outlet 22. Airflow between inlet 20 and outlet 22 is cutoff with the valve mechanism at a particular threshold rotational speed of the governor shaft. Thus, airflow to the air motor is cutoff until the speed of the motor shaft and the governor shaft decreases. Additionally, the centrifugal governor of the present invention permits the airflow between inlet 20 and outlet 22 to be controlled to provide a constant speed output of the air motor shaft, indeterminate of the load on the air motor shaft, below the threshold speed. The threshold speed at which point the governor mechanism cuts off airflow to the air motor is adjusted with knob 18.

Figure 2:
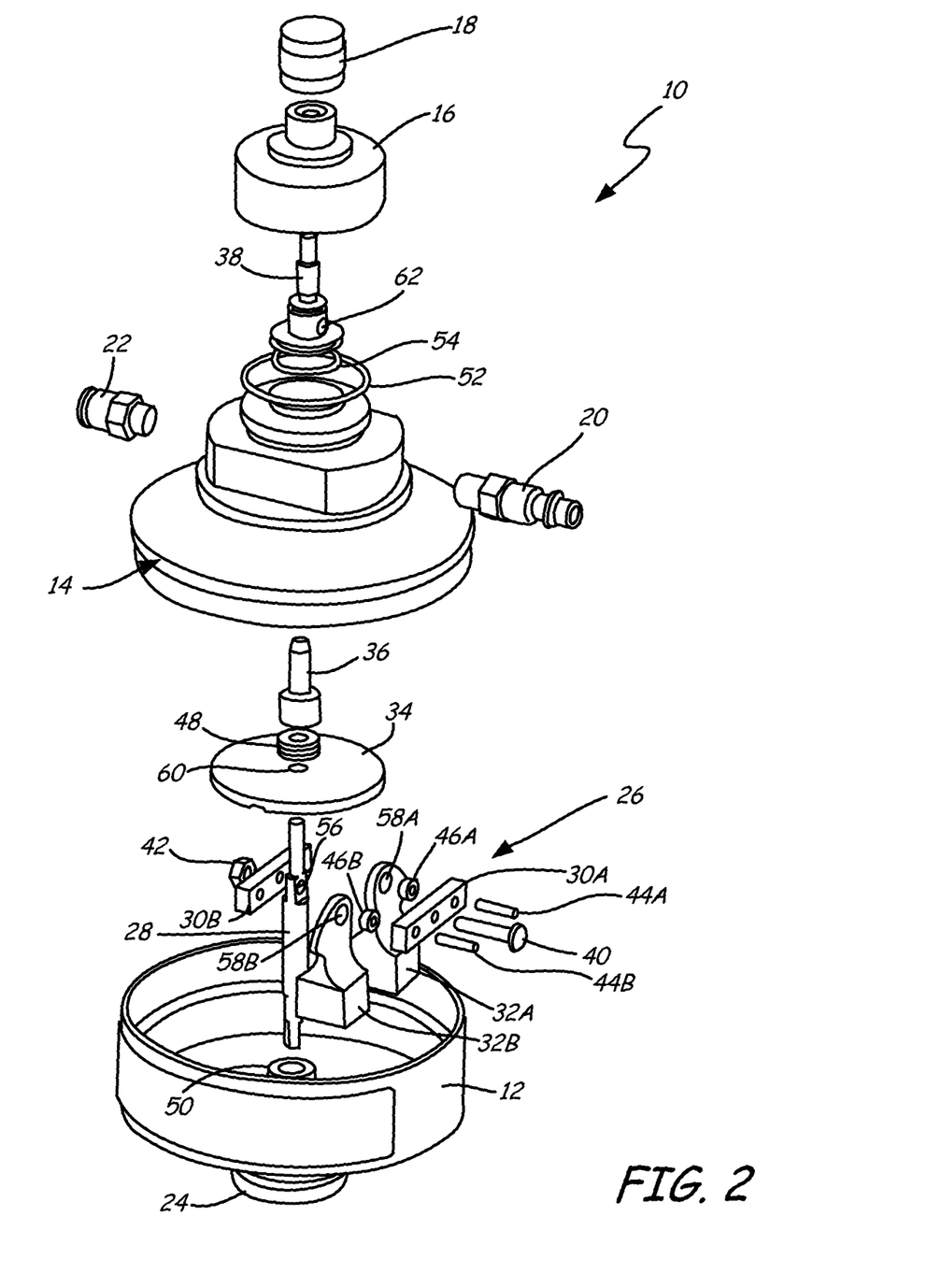
FIG. 2 is an exploded view of the centrifugal governor of FIG. 1 showing a centrifugal governor mechanism disposed within a governor housing.

FIG. 2 is an exploded view of centrifugal governor 10 of FIG. 1 showing a centrifugal governor mechanism 26 disposed between lower housing 12 and upper housing 14. Centrifugal governor 10 also includes cap 16, knob 18, inlet 20 and outlet 22. Governor mechanism 26 includes governor shaft 28, cross-bars 30A and 30B, profiled weight arms 32A and 32B, lifting plate 34, valve stem 36 and valve seat 38.

Governor mechanism 26 further comprises fastener 40, nut 42, pins 44A and 44B, bushings 46A and 46B, upper bearing 48, lower bearing 50, seal 52 and seal 54.

Cross-bars 30A and 30B are coupled to governor shaft 28 using fastener 40, which is threaded into nut 42. Cross-bars 30A and 30B can also be secured to shaft 28 in other manners, such as with a rivet. Additionally, in other embodiments, only a single cross-bar may be used. Fastener 40 is inserted through a centered bore within each of cross-bars 30A and 30B and bore 56 extending through shaft 28. Bushings 46A and 46B are inserted into holes 58A and 58B within lifting arms 32A and 32B, respectively. Top portions of profiled weight arms 32A and 32B are inserted between cross-bars 30A and 30B such that bores 58A and 58B align with a flanking bore in each of cross-bars 30A and 30B, respectively. Pins 44A and 44B are inserted through cross-bars 30A and 30B and profiled weight arms 32A and 32B, respectively. Shaft 28 extends between bearing 50 and bearing 48 within housings 12 and 14. Bore 60 of lifting plate 34 is positioned around shaft 28 such that lifting plate 34 rests on profiled weight arms 32A and 32B. Valve stem 36 is seated on a portion of shaft 28 penetrating through bearing 48. Valve stem 36 fits into a pocket within upper housing 14. Valve seat 38 extends into a socket having an opening in upper housing 14 to join with valve stem 36. Cap 16 fits over valve seat 38 and includes a bore so as to be able to permit knob 18 to couple to valve seat 38.

An output shaft of an air motor is inserted into coupler 24 to join to governor shaft 28. Governor shaft 28, cross-bars 30A and 30B, profiled weight arms 32A and 32B and lifting plate 34 rotate under input rotation from the output shaft. Valve stem 36 and valve seat 38 extend from shaft 28 such that channel 62 intersects pressurized airflow between inlet 20 and outlet 22. Seals 52 and 54 fit around upper housing 14 and valve seat 38, respectively, to prevent pressurized air from migrating into upper housing 14 and lower housing 12. Movement of profiled weight arms 32A and 32B due to centrifugal forces elevates lifting pate 34 to control the position valve stem 36 with respect to channel 62, thereby modulating flow between inlet 20 and outlet 22. Knob 18 can be rotated to independently move the position of valve seat 38 with respect to valve stem 36, thereby setting the distance that valve stem 36 can be displaced and the upper threshold rotational speed of governor shaft 28.

Figure 3:
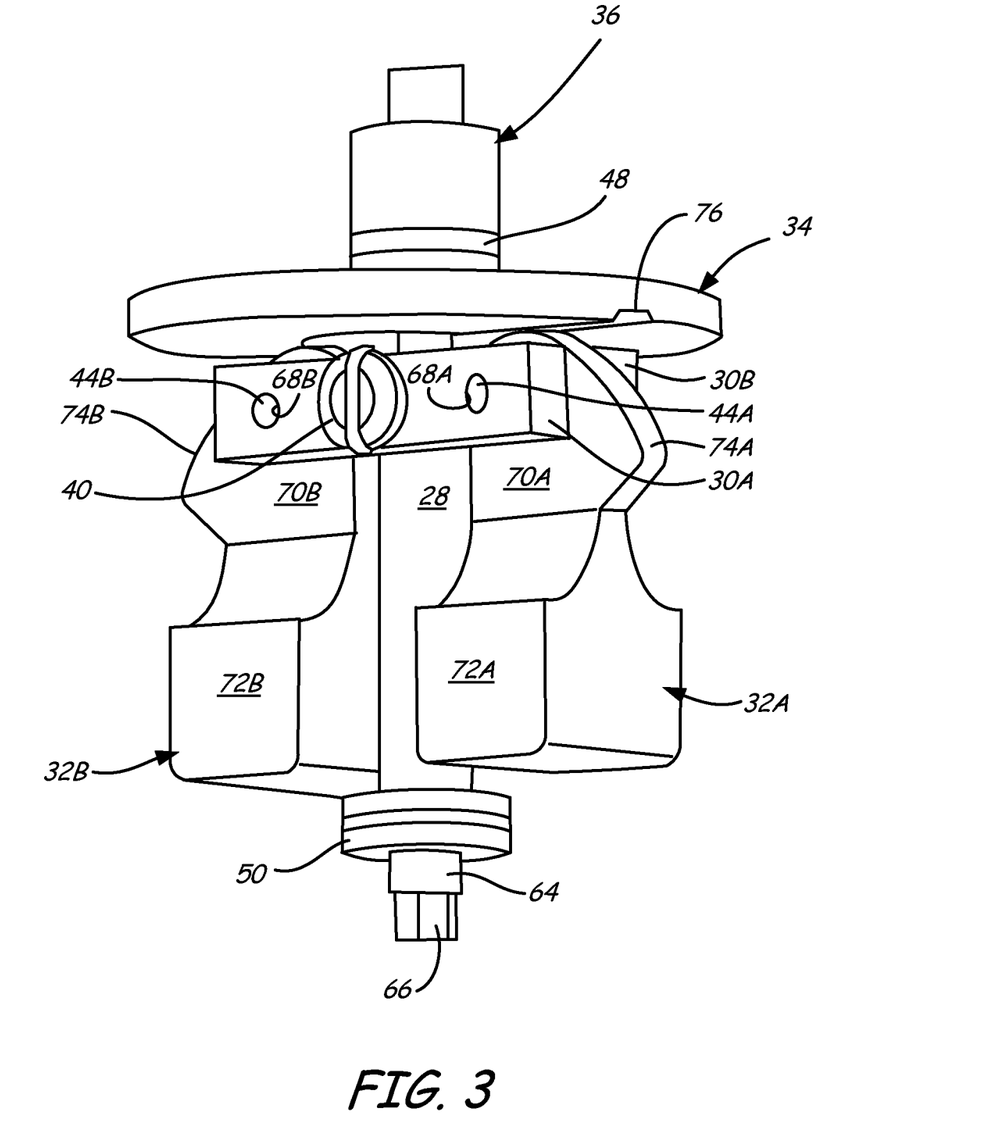
FIG. 3 is a perspective view of the governor mechanism of FIG. 2 showing a lifting plate and profiled weight arms coupled to a governor shaft.

FIG. 3 is a perspective view of governor mechanism 26 of FIG. 2 showing lifting plate 34 and profiled weight arms 32A and 32B coupled to governor shaft 28. Governor mechanism further comprises cross-bars 30A and 30B, valve stem 36, fastener 40, pins 44A and 44B, and bearings 48 and 50.

Bearing 50 is positioned over neck 64 on shaft 28. Neck 64 also includes a hex 66, or some other faceted engagement, for joining to the air motor shaft. Fastener 40 joins cross-bars 30A and 30B to shaft 28. Nut 42 (FIG. 2) is tightened onto fastener 40 so that cross-bars 30A and 30B are immobilized in a generally perpendicular alignment with the axis of rotation of shaft 28. Shaft 28 includes shoulders (FIGS. 2 & 4) for maintaining alignment and immobilization of cross-bars 30A and 30B. Pins 44A and 44B are tightly fit (e.g. force fit) into cross-bar bores 68A and 68B. Pins 44A and 44B are inserted through bushings 46A and 46B (FIG. 2) positioned within holes 58A and 58B (FIG. 2) in profiled weight arms 32A and 32B. Pins 44A and 44B may be tightly fit into bushings 46A and 46B so that the bushings rotate within holes 58A and 58B, or bushing 46A and 46B may be tightly fit into holes 58A and 58B so that pins 44A and 44B rotate with the bushings (See FIGS. 2 and 5). In any embodiment, profiled weight arms 32A and 32B are permitted to rotate about pins 44A and 44B between cross-bars 30A and 30B.

Profiled weight arms 32A and 32B comprise upper connector portions 70A and 70B, lower mass portions 72A and 72B, and profiled edges, or cams, 74A and 74B. Connector portions 70A and 70B are positioned between cross-bars 30A and 30B. Mass portions 72A and 72B are rigidly suspended from connector portions 70A and 70B. As shaft 28 rotates weight arms 32A and 32B through cross-bars 30A and 30B, centrifugal force of mass portions 72A and 72B cause rotation about pins 44A and 44B, respectively. Specifically, mass portions 72A and 72B move away from shaft 28 and towards lifting plate 34. Profiled edges 74A and 74B roll along slot 76 in lifting plate 34. Slot 76 comprises an elongate, rectangular channel running the length of plate 34 that is approximately as wide as connector portions 70A and 70B are thick. Engagement of connector portions 70A and 70B with slot 76 ensures that lifting plate 34 rotates with shaft 28.

Bearing 48 is positioned between plate 34 and valve stem 36, which is prevented from rotating within upper housing 14 (FIG. 2). However, valve stem 36 is permitted to translate away from cross-bars 30A and 30B under force from lifting arms 32A and 32B. Specifically, the distance between the surfaces of profiled edges 74A and 74B and pins 44A and 44B are varied such that the rotational position of lifting arms 32A and 32B on pins 44A and 44B determines the distance between lifting plate 34 and cross-bars 30A and 30B. As lifting plate 34 moves away from cross-bars 30A and 30B, it pushes valve stem 36 further into valve seat 38 (FIG. 2) to restrict airflow through governor 10. In the present invention, profiled edges 74A and 74B are shaped to increasingly elevate lifting plate 34 as mass portions 72A and 72B move further away from shaft 28 at higher rotational speeds to provide an upper threshold speed for shaft 28. Furthermore, profiled edges 74A and 74B are shaped to provide increasing leverage against lifting plate 34 as mass portions 72A and 72B move further away from shaft 28 at higher rotational speeds to maintain speed of shaft 28 constant below the threshold speed, independent of loading on the air motor. As will be discussed below, an operator of governor 10 can change the position of valve seat 38 to change the maximum threshold speed which governor 10 will permit the air motor to which it is attached to operate.

Figure 4:
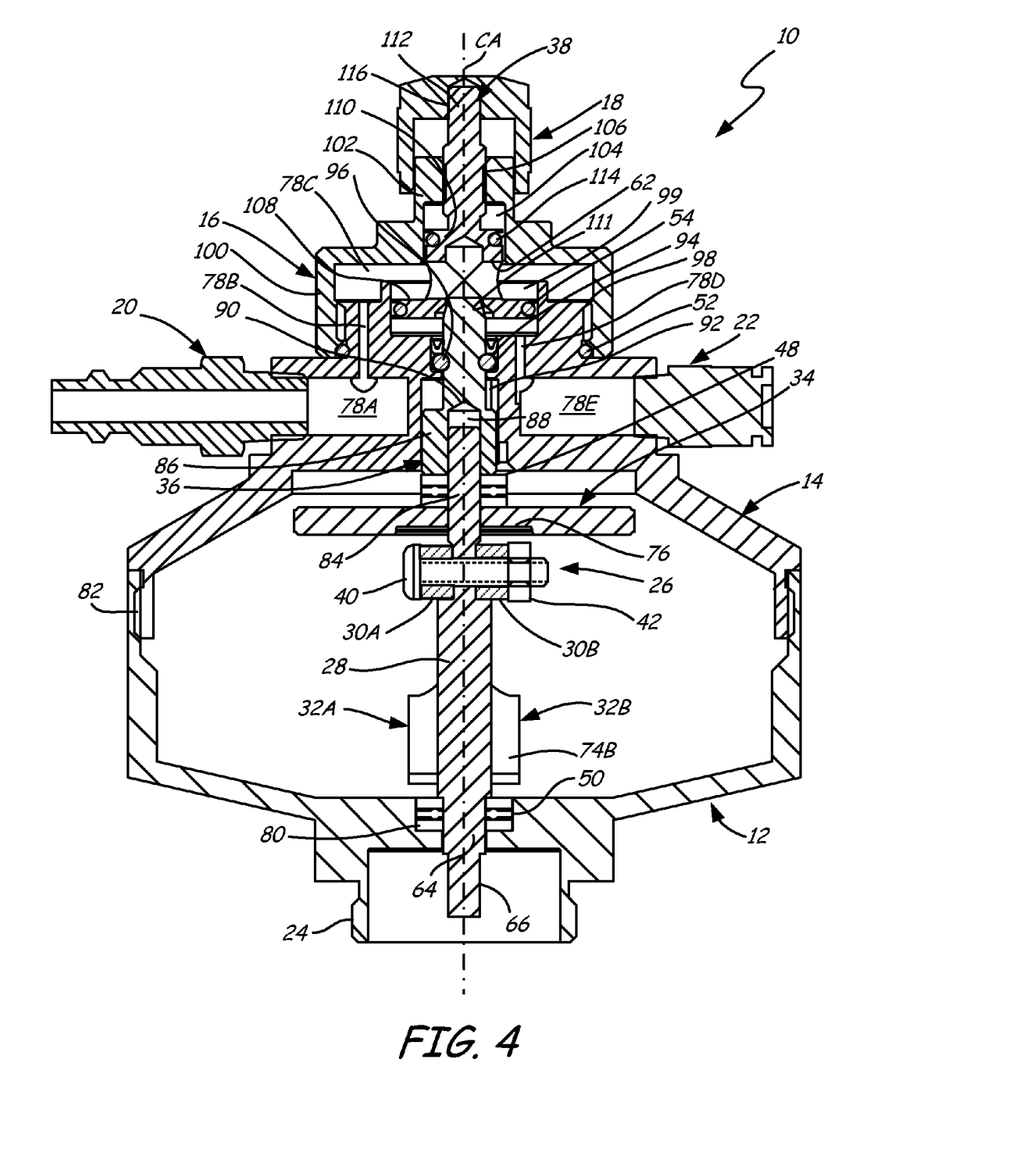
FIG. 4 is a cross-sectional view of the centrifugal governor of FIG. 1 showing an airflow path through the governor mechanism.

FIG. 4 is a cross-sectional view of centrifugal governor 10 of FIG. 1 showing airflow path 78A-78E through governor mechanism 26. Lower housing 12 includes pocket 80 and is joined to upper housing 14 at joint 82. Shaft 28 includes neck 84. Valve stem 36 includes cam 86, bore 88 and stem post 90. Upper housing includes socket 92, bore 94, seal 96, shoulder 98 and socket 99. Cap 16 includes rim 100, post 102, socket 104 and bore 106. Valve seat 38 includes base 108, cylinder 110, which includes channel 62 and transverse seat 111, post 112 and seal 114. Knob 18 includes bore 116.

Bearing 50 is fitted into pocket 80 on lower housing 12. Pocket 80 connects to coupler 24, which comprises a cylindrical flange having internal or external threads for engaging mating threads on an air motor. Neck 64 of shaft 28 is inserted into bearing 50 such that hex 66 extends into coupler 24. In one embodiment, hex 66 connects to a collet style motor connection for joining to an air motor shaft. Governor shaft 28 extends into the interior of lower housing 12 along central axis CA. Before upper housing 14 is joined to lower housing 12 at joint 82, governor assembly 26 is connected to shaft 28 as described with reference to FIGS. 2 and 3. After profiled weight arms 32A and 32B are joined to shaft 28, lifting plate 34 is positioned around neck 84 to rest on top of connector portions 70A and 70B, which ride in slot 76. Bearing 48 is also fitted around neck 84 to rest on top of lifting plate 34. Lifting plate 34 and bearing 48 include central bores such that they are coaxial with governor shaft 28 along central axis CA. Furthermore, bore 88 of valve stem 36 is aligned with central axis CA so that stem post 90 extends axially from neck 84. However, cam 86 includes a circular exterior wall with a flat portion that effectively shifts its center from that of stem post 90 and central axis CA to prevent rotation of valve stem 36 when upper housing 14 is assembled with lower housing 12.

Upper housing 14 joins with lower housing 12 at joint 82, which may comprise any suitable reusable mechanical coupling, such as a snap-fitting. Upper housing 14 and lower housing 12, thus, form an interior chamber for holding governor mechanism 26 that has adequate space to permit radially outward rotation of profiled weight arms 32A and 32B with respect to central axis CA. Socket 92 and bore 94 of upper housing 14 receive cam 86 and stem post 90, respectively. Bore 94 is co-axial with stem post 90 and thus also with shaft 28. Socket 92, which includes an interior profile mating with the exterior profile of cam 86, and cam 86 are co-axially offset from central axis CA. Interaction of cam 86 with socket 92 prevents rotation of stem post 90 when shaft 28 is rotating. Bearings 48 and 50 permit governor shaft 28 and lifting plate 34 to rotate between lower housing 12 and valve stem 36. After upper housing 14 is linked to lower housing 12, seal 96 is positioned around stem post 90.

Cap 16, knob 18 and valve seat 38 are sub-assembled before being assembled with upper housing 12. Seal 114 is positioned around cylinder 110. Post 112 is threaded into bore 106 such that the distal end of post 112 protrudes from cap 16. Post 112 extends through cap 16 far enough so that cylinder 110 engages socket 104. Cylinder 110 and socket 104 both have circular cross-sections so that cylinder 110 can rotate within socket 104. Cylinder 110, socket 104 and post 112 are coaxially aligned with central axis CA. Seal 54 is positioned around base 108. With valve seat 38 engaged with cap 18, rim 100 is threaded onto shoulder 98 of upper housing 14. Seal 52 is positioned between rim 100 and upper housing 14. Base 108 fits into socket 99 of upper housing 112 when assembled. Further, stem post 90 engages transverse seat 111 in base 108. Post 112 of valve seat 38 is force fit into bore 116 of knob 18. Knob 18 circumscribes post 102 of cap 18, but does not tightly engage post 102 such that rotation of knob 18 is not inhibited.

Rotation of knob 18 is used to adjust the position of channel 62 and seat 111 of valve stem 38 to control the airflow through airflow path 78A-78E. Compressed air is introduced into upper housing 12 at inlet 20. From inlet 20, the air flows into path 78A, is redirected upward (with reference to the orientation of FIG. 4) through path 78B, which comprises a small diameter bore extending into upper housing 14 to engage path 78A. From path 78B, the air disperses into path 78C, which comprises the space between upper housing 14 and cap 16. The air enters channel 62 from both sides and travels into seat 111 (See FIG. 5). Thus, the ends of channel 62 comprise inlets with seat 111 comprising an outlet. After passing through base 108, the air travels inward (with reference to the orientation of FIG. 4) to path 78D before entering path 78E and leaving upper housing 14 at outlet 22. Path 78D comprises a small diameter bore extending into upper housing 14 to engage path 78E. Note that, FIG. 4 shows governor assembly 26 in a locked position where stem post 90 fully engages seat 111 to prevent profiled weight arms 32A and 32B from rotating outward. In such a position, air is not permitted to travel through seat 111. From the locked position, an operator rotates knob 18 to control the position of seat 111 with respect to stem post 90. Knob 18 is rotated to retract base 108 from stem post 90. The further base 108 is retracted, the farther profiled weight arms are permitted to rotate, thereby permitting faster rotational speeds of shaft 28, as will be discussed in greater detail with respect to FIGS. 5-6B.

Figure 5:
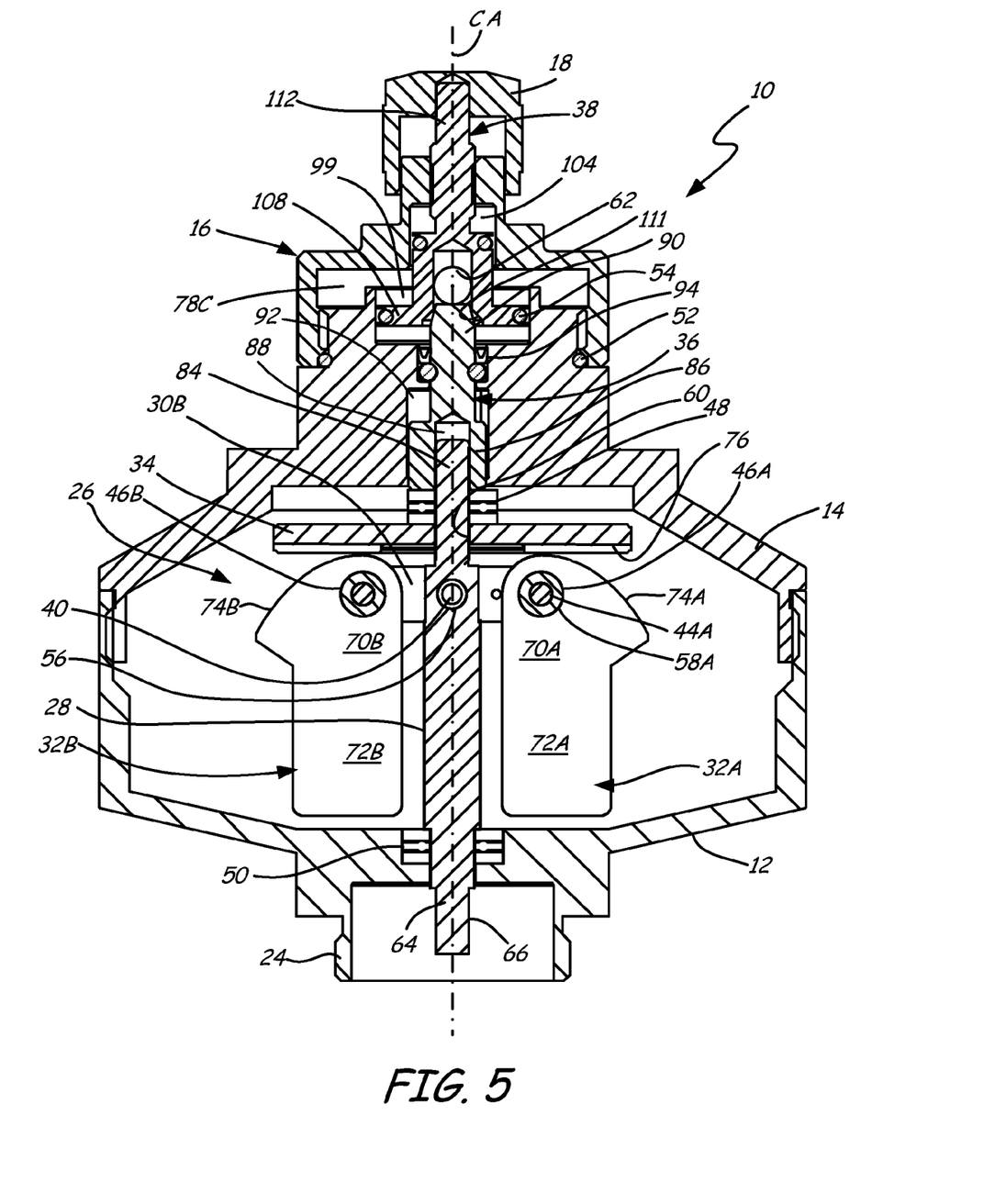
FIG. 5 is a cross-sectional view of the centrifugal governor of FIG. 1 showing interaction of the governor mechanism with the airflow path of FIG. 4.

FIG. 5 is a cross-sectional view of centrifugal governor 10 of FIG. 1 showing interaction of governor mechanism 26 with airflow path 78A-78E of FIG. 4. Operation of the air motor to which governor 10 is attached rotates governor shaft 28 at the same speed as the air motor shaft. Rotation of shaft 28 causes profiled weight arms 32A and 32B to be subject to centrifugal force. Centrifugal force, as is known in the art, is determined by the rotational velocity of the weight arm (as determined by the rotational speed of governor shaft 28), the mass of the weight arm (as is primarily influenced by mass portions 72A and 72B), and the distance between central axis CA of shaft 28 and mass portions 72A and 72B. As the rotational speed of shaft 28 increases, the centrifugal force acting on profiled weight arms 32A and 32B pushes mass portions 72A and 72B radially outward away from shaft 28. The pinned connection at pins 44A and 44B of connector portions 70A and 70B causes weight arms 32A and 32B to rotate about pins 44A and 44B. The torque applied at pins 44A and 44B by lifting arms 32A and 32B is determined by the mass moment arm of mass portions 72A and 72B (e.g. the distance between the center of mass of mass portions 72A and 72B and the pivot point at pins 44A and 44B). This rotation causes profiled edges 74A and 74B to roll along slot 76 of lifting plate 34. The shape of profiled edges 74A and 74B causes lifting arms 32A and 32B to push lifting plate 34 upwards (with reference to the orientation of FIG. 5). Profiled edges 74A and 74B apply a force to lifting plate 34 proportional to the lifting plate lever arm (e.g. the distance between the pivot point at pin 44A and the contact point between lifting plate 34 and profiled edges 74A).

Elevation of lifting plate 34 pushes bearing 48 and valve stem 36 upward (with reference to the orientation of FIG. 5). Shaft neck 84 extends into bearing 48 and bore 88 of valve stem 36, and rotates due to rotation of governor shaft 28. Engagement of cam 86 with socket 92 prevents rotation of valve stem 36. Bearing 48 permits relative rotation between lifting plate 34 and valve stem 36. However, bearing 48 pushes valve stem 36 axially upward such that stem post 90 moves further into bore 94. Movement of valve stem 36 pushes stem post 90 closer to transverse seat 111 of valve seat 38, which restricts airflow between airflow paths 78C and 78D (FIG. 4), until transverse seat 111 is contacted. Engagement of stem post 90 with transverse seat 111 determines the threshold speed of the air motor. The position of seat 111 is controlled using knob 18.

Post 112 of valve seat 38 is inserted into bore 116 of knob 18. Post 112 is affixed to bore 116 so as to be able to transmit torque. For example, post 112 can be force-fit or secured with a set-screw extending through knob 18. Walls of knob 18 circumscribe post 102 of upper cap 16. Knob 18 comes into close contact with post 102 so as to prevent dust and debris from entering cap 16, but so as to not interfere with rotation of knob 18. Rotation of knob 18 rotates post 112 within a threaded engagement with bore 106, which moves valve seat 38 up or down within socket 104. Movement of valve seat 38 also moves base 108 and transverse seat 111 within socket 99, thereby altering the shape of the restriction between airflow path 78C and airflow path 78D (FIG. 4).

Engagement of stem post 90 and transverse seat 111 is provided with two degrees of freedom, one from movement of valve stem 36 and one from movement of valve seat 38. Movement of valve seat 38 and transverse seat 111 controls how fast governor shaft 28 is permitted to rotate. Specifically, lowering of transverse seat 111 within socket 99 dictates that stem post 90 will engage seat 111 at a lower position. This lower position defines the uppermost point to which lifting plate 34 can be moved by lifting arms 32A and 32B. The lowering of the uppermost limit of lifting plate 34 also limits how far mass portions 74A and 74B can be swung out form governor shaft 28. The less mass portions 74A and 74B are able to swing, the lower rotational speeds are required of shaft 28 to move mass portions 74A and 74B into their engagement with seat 111. Thus, the top speed of shaft 28 is limited at a lower input speed to shaft 28. In the event of a severe overspeed condition, arms 32A and 32B will push lifting plate 34 and stem post 90 into transverse seat 111 closing off all airflow through from airflow path 78C to airflow path 78D. Below this threshold speed, lifting arms 32A and 32B of the present invention are further shaped to maintain rotation of governor shaft 28 at a constant speed, independent of loading on the air motor shaft 28 to which governor shaft 28 is connected. Specifically, profiled edges 74A and 74B are shaped to balance the forces acting on lifting plate 34 from the air in airflow paths 78A-78E and from lifting arms 32A and 32B.

Figure 6A:
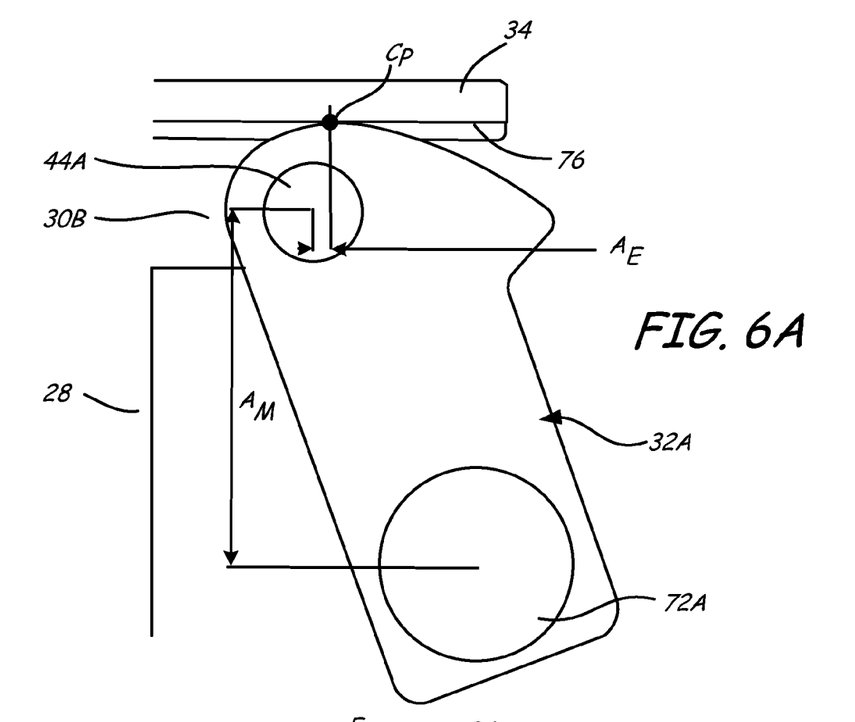
FIGS. 6A and 6B show displacement of a lifting plate for different positions of profiled weight arms of the governor mechanism of FIGS. 2-5.
Figure 6B:
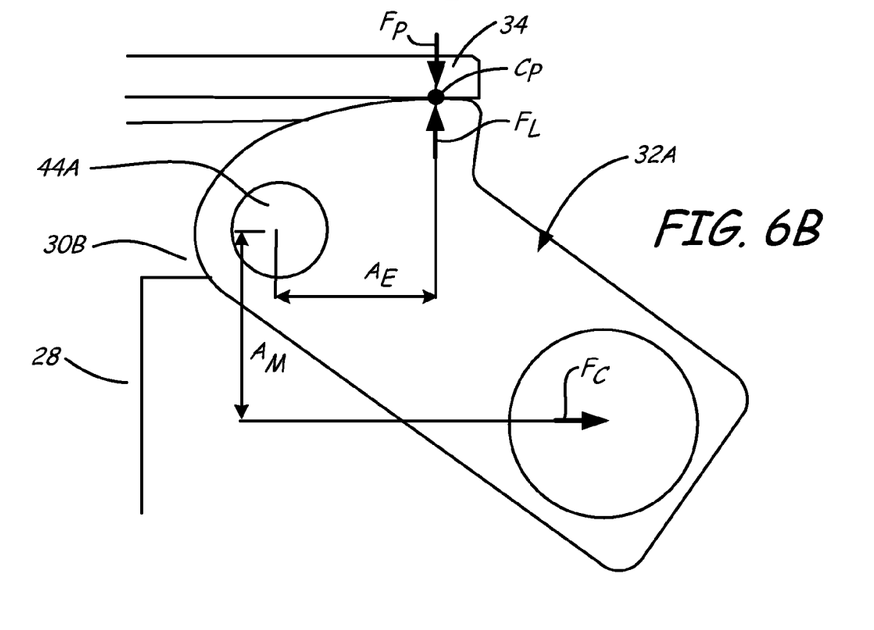

FIGS. 6A and 6B show displacement of lifting plate 34 for different positions of profiled weight arms 32A and 32B of governor mechanism 26 of FIGS. 2-5. Specifically, FIG. 6A shows the position of weight arm 32A for a low rotational speed of governor shaft 28, while FIG. 6B shows the position of weight arm 32A for a high rotational speed of governor shaft 28. Profiled edge 74A contacts lifting plate 34 at contact point CP within slot 76. Contact point CP is extended from the pivot point at pin 44A by a distance that forms edge moment arm $A_E$. Mass portion 72A is extended from the pivot point at pin 44A by a distance that forms mass moment arm $A_m$.

Centrifugal force $F_C$ and moment arm $A_m$ determine how much rotational force mass portion 72A will cause of lifting arm 32A about pin 44A, which ultimately determines the lifting force $F_L$ with which profiled edge 74A will push against lifting plate 34. The lifting force $F_L$ must be equalized by the pressure force $F_P$ from the compressed air acting against lifting plate 34 to maintain lifting plate stationary under equilibrium, as shown in Equation 1.

$$F_L = F_P \quad \text{[Equation 1]}$$

Additionally, the moments generated at pin 44A by centrifugal force $F_C$ and pressure force $F_P$ must balance, as shown in Equation 2, to keep lifting arm 32A from rotating under equilibrium. The moment at pin 44A from mass portion 72A is determined by multiplying centrifugal force $F_C$ by mass moment arm $A_m$. The moment at pin 44A from the compressed air is determined by multiplying pressure force $F_P$ by edge moment arm $A_E$.

$$F_C A_m = F_P A_E \quad \text{[Equation 2]}$$

As can be seen in FIGS. 6A and 6B, moment arm $A_m$ becomes smaller as mass portion 72A moves away from shaft 28 and closer to lifting plate 34. Conversely, moment arm $A_E$ becomes larger as mass portion 72A moves away from shaft 28 and contact point CP rolls further away from pin 44A in slot 76. Thus, at slow rotational speeds of governor shaft 28, mass portion 72A will tend to produce a large amount of rotation of lifting arm 32A, causing profiled edge 74A to elevate lifting plate 34 accordingly. As moment arm $A_m$ becomes smaller, the lifting force from rotation of lifting arm 32A becomes weaker. However, the lifting force from profiled edge 74A becomes increasingly stronger. This permits lifting arm 32A to maintain the force with which it elevates lifting plate 34. This feature, derived from the shape of profiled edge 74A, permits governor assembly 26 to maintain a constant speed of shaft 28.

The speed of governor shaft 28 is determined by how much compressed air is permitted to pass into airflow path 78D. More airflow permits the air motor to which shaft 28 is connected to rotate faster. Additionally, the speed of shaft 28 is slowed by the load placed on the air motor by the tool it is driving. Thus, even though a steady supply of compressed air is supplied to the air motor, its speed can decrease under heavy loading.

In the present invention, governor assembly 26 permits additional airflow to be provided during heavy loading such that the speed of the air motor does not decrease. Such a result is achieved by the capability of governor assembly 26 to balance 1) the downward force acting on lifting plate 34 from the compressed air (as translated through valve stem 36 and bearing 48), and 2) the upward force acting on lifting plate 34 from lifting arms 32A and 32B. The force from the compressed air is determined by the pressure of the compressed air provided to inlet 20 (FIG. 4), which is constant. For example, inlet 20 is typically connected to a source of compressed air within a factory. Thus, as the loading on the air motor shaft increases, the air motor shaft slows the rotation of governor shaft 28, which causes lifting arms 32A and 32B to lower. Lowering of lifting arms 32A and 32B permits additional airflow to enter seat 111 and exit outlet 22, thereby increasing the speed of the air motor to offset the speed decrease from loading. Lifting arms 32A and 32B will swing outward on pins 44A and 44B until lifting plate 34 is in a state of equilibrium. Equilibrium is achieved by the shape of profiled edges 74A and 74B. Profiled edges 74A and 74B move the instantaneous center of contact point CP to change the ratio between $A_E$ and $A_m$, thereby balancing equation 1. For example, at higher rotational speeds, as shown in FIG. 6B, weight arms 32A and 32B are at a higher angular position due to larger centrifugal force, reducing moment arm $A_m$. Thus, weight arms 32A and 32B require a larger moment arm $A_E$ to obtain equilibrium.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A centrifugal governor comprising:
    a housing;
    a valve seat mounted within the housing;
    a governor shaft mounted to the housing to rotate along an axis;
    a centrifugal arm rotatably linked to the governor shaft at a pivot point so as to be extendable in a radial direction from the axis, the centrifugal arm including an arcuately profiled edge that is non-uniformly disposed with respect to the pivot point; and a valve stem mechanically resting against the arcuately profiled edge within the housing to engage the valve seat;
a lifting plate through which the governor shaft extends and positioned between the profiled edge and the valve stem;
a first bearing positioned around the governor shaft between a first end of the governor shaft and the housing; and
a second bearing positioned around a second end of the governor shaft between the valve stem and the lifting plate;
wherein rotation of the centrifugal arm displaces the valve stem with respect to the valve seat.

2. The centrifugal governor of claim 1 wherein the governor shaft further comprises:
a crossbar rigidly joined to the governor shaft, the crossbar including the pivot point.

3. The centrifugal governor of claim 1 wherein the centrifugal arm comprises:
a connector portion comprising a plate for joining to the governor shaft at the pivot point; and
a mass portion extending from the connector portion so as to be pivotable away from the governor shaft;
wherein the connector portion includes the arcuately profiled edge.

4. The centrifugal governor of claim 1 wherein the governor shaft extends coaxially into the valve stem, and the valve stem extends coaxially into the valve seat.

5. The centrifugal governor of claim 1 and further comprising:
a crossbar rigidly joined to the governor shaft;
a first centrifugal arm pivotably joined to the crossbar at a first pivot point such that a first profiled edge extends beyond the crossbar towards the valve stem; and
a second centrifugal arm pivotably joined to the crossbar at a second pivot point such that a second profiled edge extends beyond the crossbar towards the valve stem.

6. The centrifugal governor of claim 1 wherein the valve seat is adjustably mounted to the housing to change a distance the centrifugal arm can displace the valve stem.

7. A centrifugal governor comprising:
a housing;
a valve seat mounted within the housing;
a governor shaft mounted to the housing to rotate along an axis;
a centrifugal arm rotatably linked to the governor shaft at a pivot point so as to be extendable in a radial direction from the axis, the centrifugal arm including an arcuately profiled edge that is non-uniformly disposed with respect to the pivot point;
a valve stem mechanically resting against the arcuately profiled edge within the housing to engage the valve seat and including a cam mounted to the housing in a socket offset from the axis to prevent rotation of the valve stem;
a lifting plate through which the governor shaft extends and positioned between the profiled edge and the valve stem and including a slot in which the arcuately profiled edge rides so that the lifting plate rotates with the governor shaft; and
wherein rotation of the centrifugal arm displaces the valve stem with respect to the valve seat and wherein the governor shaft extends coaxially into the valve stem, and the valve stem extends coaxially into the valve seat.

8. A centrifugal governor comprising:
a housing;
a valve seat mounted within the housing;
a cap having a bore coupled to the housing to contain the valve seat within the housing;
a valve seat post threaded into the bore in the cap;
a knob joined to the valve seat post to rotate the valve seat;
a governor shaft mounted to the housing to rotate along an axis;
a centrifugal arm rotatably linked to the governor shaft at a pivot point so as to be extendable in a radial direction from the axis, the centrifugal arm including an arcuately profiled edge that is non-uniformly disposed with respect to the pivot point; and
a valve stem mechanically resting against the arcuately profiled edge within the housing to engage the valve seat;
wherein the valve seat is adjustably mounted to the housing to change a distance the centrifugal arm can displace the valve stem.

9. A centrifugal governor comprising:
a housing;
a valve seat mounted within the housing;
a governor shaft mounted to the housing to rotate along an axis;
a centrifugal arm rotatably linked to the governor shaft at a pivot point so as to be extendable in a radial direction from the axis, the centrifugal arm including an arcuately profiled edge that is non-uniformly disposed with respect to the pivot point;
a valve stem mechanically resting against the arcuately profiled edge within the housing to engage the valve seat;
a channel extending through the valve seat from a first end to a second end;
an inlet extending into the housing so as to be fluidly coupled to the first end of the channel; and
an outlet extending into the housing so as to be fluidly coupled to the second end of the channel;
wherein rotation of the centrifugal arm displaces the valve stem with respect to the valve seat and wherein the arcuately profiled edge is configured to rotate to push the valve stem into the channel between the first end and the second end to restrict airflow from the inlet to the outlet.

10. A rotational speed governor for an air motor, the governor comprising:
a housing having an air inlet and an air outlet;
a shaft extending along an axis within the housing;
a crossbar connected to the shaft;
a plate intersecting the shaft; and
a valve disposed between the air inlet and the air outlet, the valve comprising:
a valve seat disposed between the air inlet and the air outlet, the vale seat including a channel;
a valve stem engaged with the plate and having a stem post extending towards the channel of the valve seat;
wherein the valve seat is adjustable with respect to the housing so as to change a distance between the stem post and the channel;
a pair of weights rotatably connected to the crossbar at pivot points, each weight comprising a profiled edge extending beyond the crossbar to engage the plate, the profiled edges being shaped to increase a moment arm on the plate as the weights pivot away from the shaft;
a first bearing positioned around the shaft between a first end of the shaft and the housing; and a second bearing positioned around the shaft at a second end between the valve stem and the plate;

wherein the plate intersects the shaft between the valve stem and the crossbar; and wherein the shaft extends coaxially into the valve stem, and the valve stem extends coaxially into the valve seat.

11. The rotational speed governor of claim 10 wherein the profiled edges are arcuate and non-uniformly disposed with respect to the pivot points.

12. The rotational speed governor of claim 10 wherein each weight comprises:

a connector portion comprising a plate for joining to the crossbar at the pivot points; and a mass portion extending from the connector portion so as to be pivotable away from the shaft;

wherein the connector portion includes the profiled edge.

13. A centrifugal governor comprising:

a housing having an air inlet and an air outlet;

a valve disposed between the air inlet and the air outlet;

a shaft extending along an axis within the housing;

a crossbar connected to the shaft;

a plate intersecting the shaft between the valve and the crossbar and including a slot;

a pair of weights rotatably connected to the crossbar at pivot points, each weight comprising a profiled edge extending beyond the crossbar to engage the plate, the profiled edges being shaped to ride in the slot of the plate and to increase a moment arm on the plate as the weights pivot away from the shaft;

a valve stem including a cam mounted to the housing in a socket offset from the axis to prevent rotation of the valve stem; and wherein the plate, which includes the slot in which the profiled edges ride, rotates with the shaft.

14. A centrifugal governor for an air motor, the centrifugal governor comprising:

a housing comprising:
an air inlet;
an air outlet;
a first valve socket;
a second valve socket;
a shaft socket; and
a cap for containing a valve seat within the first socket;

a valve seat configured to adjustably translate within the first valve socket, the valve seat, comprising:
an air path extending between the air inlet and the air outlet;
a cylinder that translates within the first socket; and
a threaded post that extends from the cylinder to engage a threaded bore in the cap;

a valve stem configured to freely slide within the second valve socket, the valve stem including a stem post that intersects the air path in the valve seat;

a governor shaft that extends along an axis, the governor shaft having:
a first end disposed in the shaft socket; and
a second end engaging the valve stem; and a governor mechanism coupled to the governor shaft that pushes the valve stem along the second end of the governor shaft within the second valve socket under centrifugal force, the governor mechanism comprising a profiled surface that applies increasing force to the valve stem under increasing rotational speed of the governor shaft.

15. The centrifugal governor of claim 14 wherein the governor mechanism comprises:

a lifting plate through which the second end of the governor shaft extends;

a crossbar rigidly joined to the governor shaft; and a pair of weight arms joined to distal ends of the crossbar so as to be able to rotate away from the governor shaft under centrifugal loading, each weight arm having a profiled edge that engages the lifting plate, the profiled edges being shaped to increase a moment arm on the lifting plate as the weight arm moves further away from the governor shaft.

* * * * *